United States Patent
Steinlage et al.

(10) Patent No.: US 6,550,317 B2
(45) Date of Patent: Apr. 22, 2003

(54) X-RAY TUBE BALANCING METHOD

(75) Inventors: Gregory Alan Steinlage, Milwaukee, WI (US); Brian Douglas Lounsberry, Thiensville, WI (US); David Bradford Chapin, New Berlin, WI (US); Willi Walter Hampel, St. Francis, WI (US)

(73) Assignee: GE Medical Systems Global Technology Co., LLC, Waukesha, WI (US)

( * ) Notice: Subject to any disclaimer, the term of this patent is extended or adjusted under 35 U.S.C. 154(b) by 0 days.

(21) Appl. No.: 09/682,503

(22) Filed: Sep. 10, 2001

(65) Prior Publication Data

US 2003/0046987 A1 Mar. 13, 2003

(51) Int. Cl.[7] ................................................ G01M 1/00
(52) U.S. Cl. ...................................................... 73/65.01
(58) Field of Search ................................ 73/65.01, 483; 33/506; 378/4; G01M 1/00

(56) References Cited

U.S. PATENT DOCUMENTS

| | | | | |
|---|---|---|---|---|
| 1,367,478 A | * | 2/1921 | Hapgood | 74/589 |
| 1,774,718 A | * | 9/1930 | McCabe | 73/65.01 |
| 2,576,468 A | * | 11/1951 | Martin | 73/65.01 |
| 3,210,989 A | * | 10/1965 | Samborsky et al. | 73/65.01 |
| 3,290,925 A | * | 12/1966 | Wallace | 73/65.01 |
| 3,841,148 A | * | 10/1974 | Becker | 73/65.01 |
| 3,935,747 A | * | 2/1976 | Boehret | 73/483 |
| 4,078,422 A | * | 3/1978 | Brunsch et al. | 73/65.01 |
| 5,154,001 A | * | 10/1992 | Ester et al. | 33/506 |
| 5,448,608 A | * | 9/1995 | Swain et al. | 378/4 |
| 6,098,025 A | * | 8/2000 | Bae | 702/94 |

FOREIGN PATENT DOCUMENTS

| | | | | |
|---|---|---|---|---|
| EP | 658332 | * | 6/1995 | A61B/6/10 |
| JP | 357165731 | * | 12/1982 | G01M/1/00 |

OTHER PUBLICATIONS

Politzer, 'Shell' A Computer Program for Determining the Physical Properties of Artillery Shell and Related Items, May 62.*
Unknown, Measure Moment of Inertia and Center of Gravity with Unprecedented Accuracy, Space Electronics, Inc., KSR sales brochure.*

* cited by examiner

Primary Examiner—Daniel S. Larkin
Assistant Examiner—Jay L. Politzer
(74) Attorney, Agent, or Firm—Peter J. Vogel (57) ABSTRACT

An imaging tube (16) and an apparatus (60) and a method for pre-balancing the imaging tube (16) for use in an imaging system (10) are provided. The imaging tube mass and center of mass are determined. Desired values for the imaging tube mass and imaging tube center of mass are also determined. A mass correction value and a center of mass correction value are calculated in response to the imaging tube mass, the imaging tube center of mass, and the desired values. The imaging tube mass and the imaging tube center of mass are adjusted in response to the mass correction value and the center of mass correction value respectively.

8 Claims, 9 Drawing Sheets

X-RAY TUBE BALANCING METHOD

BACKGROUND OF INVENTION

The present invention relates generally to computed tomography imaging systems, and more particularly to a method and apparatus for pre-balancing an X-ray tube before use in a gantry.

There is a continuous effort to increase computed. tomography (CT) imaging system capabilities. CT imaging system imaging speeds are continuously increasing. The increase in imaging speed allows physicians to gather CT images and constructions in a matter of seconds rather than several minutes as with previous CT imaging systems. Although the increase in imaging speed provides improved imaging capability, it causes new constraints and requirements for the functionality of the CT imaging systems.

The CT imaging system includes a gantry that rotates at various speeds in order to create a 360° image. The gantry is balanced so as to provide an accurate and clear image versus rotating out of balance, which would provide not only poor image quality but also degradation in dynamically moving CT imaging system components. The higher the rotational imaging frequency of the CT imaging system, the more critical and the more accurate the balancing of the gantry becomes, so as to maintain high image quality.

The gantry contains a X-ray tube, which composes a large portion of the rotating gantry mass. The X-ray tube is replaced often, because of limited X-ray tube life. Due to variation in X-ray tube mass and center of mass position, replacement of an X-ray tube often requires gantry rebalancing in order to minimize gantry vibration and to ensure high quality imaging.

Rebalancing of the gantry can be costly and time consuming. As with many types of equipment used in service industries, down time is preferably minimized. Therefore, it would be desirable to replace the X-ray tube without affecting the gantry balance, thereby reducing the need for gantry rebalancing necessitated by a X-ray tube replacement. The improved technique may decrease down time, which would save costs not only in balancing of the gantry but also in loss of imaging time.

SUMMARY OF INVENTION

Accordingly, an advantage of the present invention is to provide an improved balancing method for use in a computed tomography (CT) imaging system.

The foregoing and other advantages are provided by a method and apparatus for pre-balancing an imaging tube before use in an imaging system. The method includes determining the imaging tube mass and the imaging tube center of mass. A desired mass and a desired center of mass are also determined. A mass correction value is calculated in response to the imaging tube mass, the desired mass, and the desired center of mass. A center of mass correction value is also calculated in response to the imaging tube mass, center of mass, and the desired center of mass. The imaging tube mass and the imaging tube center of mass are adjusted in response to the mass correction value and the center of mass correction value.

An imaging tube balancing system is also provided including a controller, which has a memory with stored desired mass values and desired center of mass values that correspond to an imaging tube and an imaging system. The controller determines a desired mass value and a desired center of mass value in response to a known imaging tube and a known imaging system.

The present invention provides a method for balancing an imaging tube before its use in an imaging system. Thus, reduces the probability that the imaging system will need to be balanced if the imaging tube needs to be replaced. The present invention is also cost effective and time efficient.

Another advantage of the present invention is that it provides an accurate method for balancing the imaging tube, thereby allowing the imaging system to generate excellent quality images.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

In each of the following figures, the same reference numerals are used to refer to the same components. While the present invention is described with respect to a method and apparatus for pre-balancing an imaging tube before use in a computed tomography (CT) imaging system, the present invention may be adapted to be used in various other systems that require system level balancing or balancing of componentry.

A CT imaging system includes a rotating gantry which contains various components such as: a collimator, an X-ray detector, a high voltage tank, a data logger, and other componentry, all of which may be balanced using the present invention. Note that there is not a need to balance componentry contained within the gantry that lasts the lifetime of the gantry.

In the following description, various operating parameters and components are described for one constructed embodiment. These specific parameters and components are included as examples and are not meant to be limiting.

Figure 1:
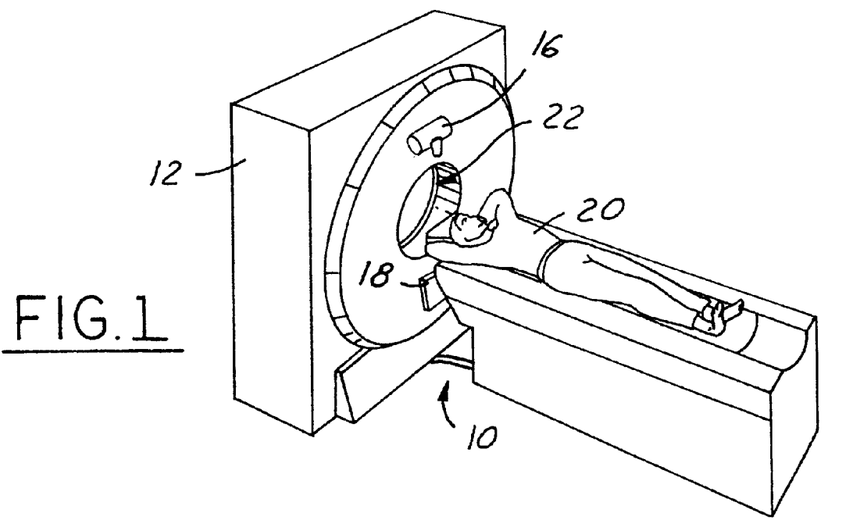
FIG. 1 is a pictorial view of a computed tomography imaging system, utilizing a pre-balancing method in accordance with an embodiment of the present invention.

Referring now to FIG. 1, a pictorial view of a CT imaging system 10, utilizing a pre-balancing method in accordance with an embodiment of the present invention is shown. The imaging system 10 includes a gantry 12 that has an X-ray imaging tube 16. The imaging tube 16 projects a beam of x-rays toward a detector array 18. The x-rays after passing through the medical patient 20, within the patient bore 22, are detected and used to create a CT image or construction. The quality of the image is related to the rotating speed and balancing accuracy of the gantry 12.

Figure 2:
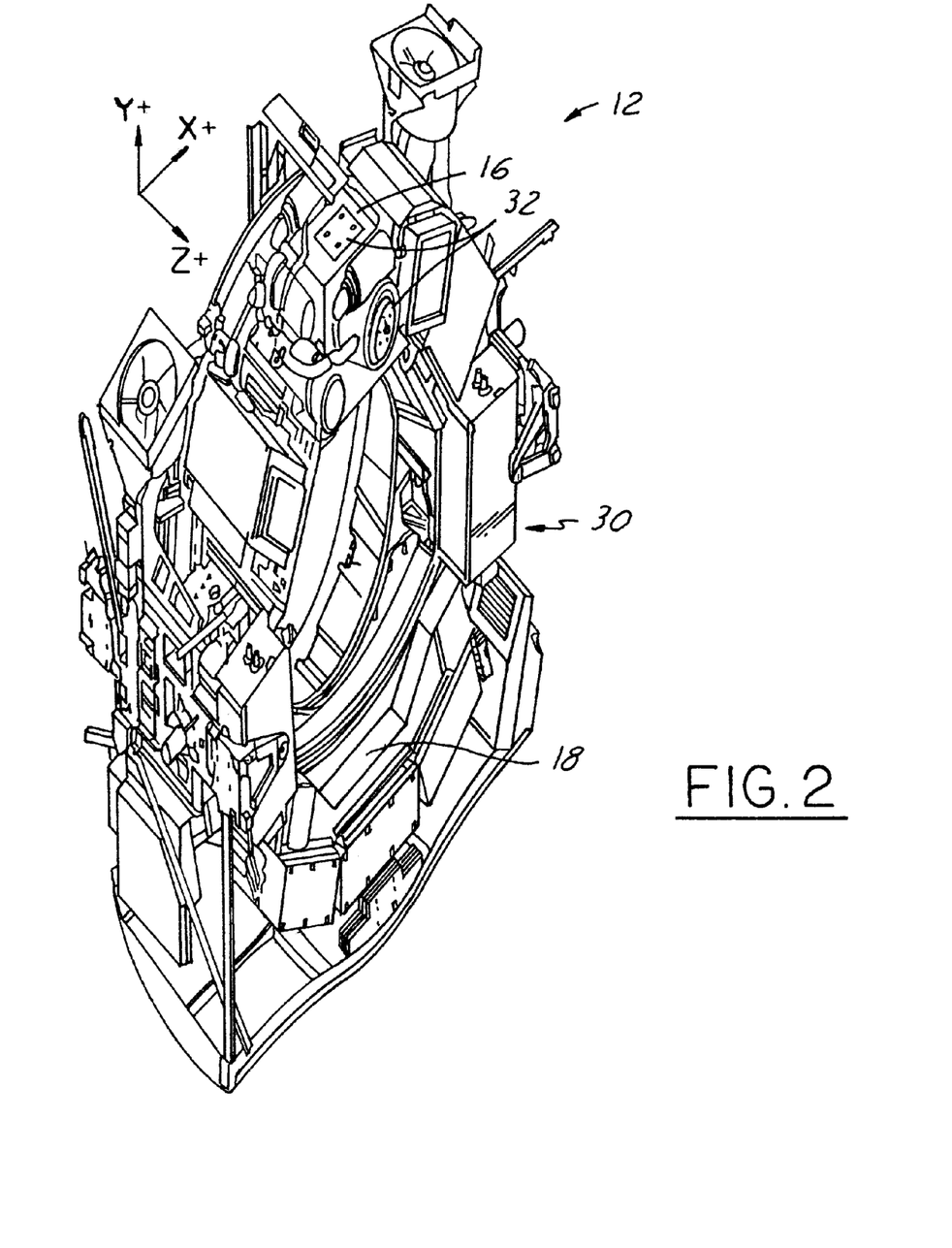
FIG. 2 is a perspective view of a gantry inner componentry and rotating portion using an imaging tube in accordance with an embodiment of the present invention.

Referring now to FIG. 2, a perspective view of the inner componentry and rotating portion 30 of the gantry 12 having an X, Y, and Z-axis, and using the imaging tube 16 in accordance with an embodiment of the present invention is shown. The rotating portion 30 rotates about the Z-axis to create a 360° image. The rotating portion 30 is balanced as to prevent tilting of the rotating portion 30 about the X or Y-axis, dynamic imbalance, and motion about the z-axis, static imbalance. Static and dynamic imbalance degrades image quality and also may degrade the performance of both rotating and stationary gantry components.

When an imaging tube 16 is replaced, instead of rebalancing the gantry 12, a replacement imaging tube is pre-balanced to have mass and center of mass values that approximately match desired mass and center of mass values. In so doing, the replacement imaging tube has equivalent mass and center of mass to the imaging tube 16 being replaced. The desired mass and center of mass values are predetermined to correspond to the imaging tube 16 and the imaging system 10. During pre-balancing of the imaging tube 16 multiple imaging tube balance adjustment plates 32 may be mounted to the imaging tube 16. The adjustment plates 32 alter the mass and center of mass of the imaging tube 16 to approximately match the predetermined desired mass and center of mass values. Proper selection and placement of the adjustment plates 32 prevents rebalancing of the gantry 12.

Figure 3A:
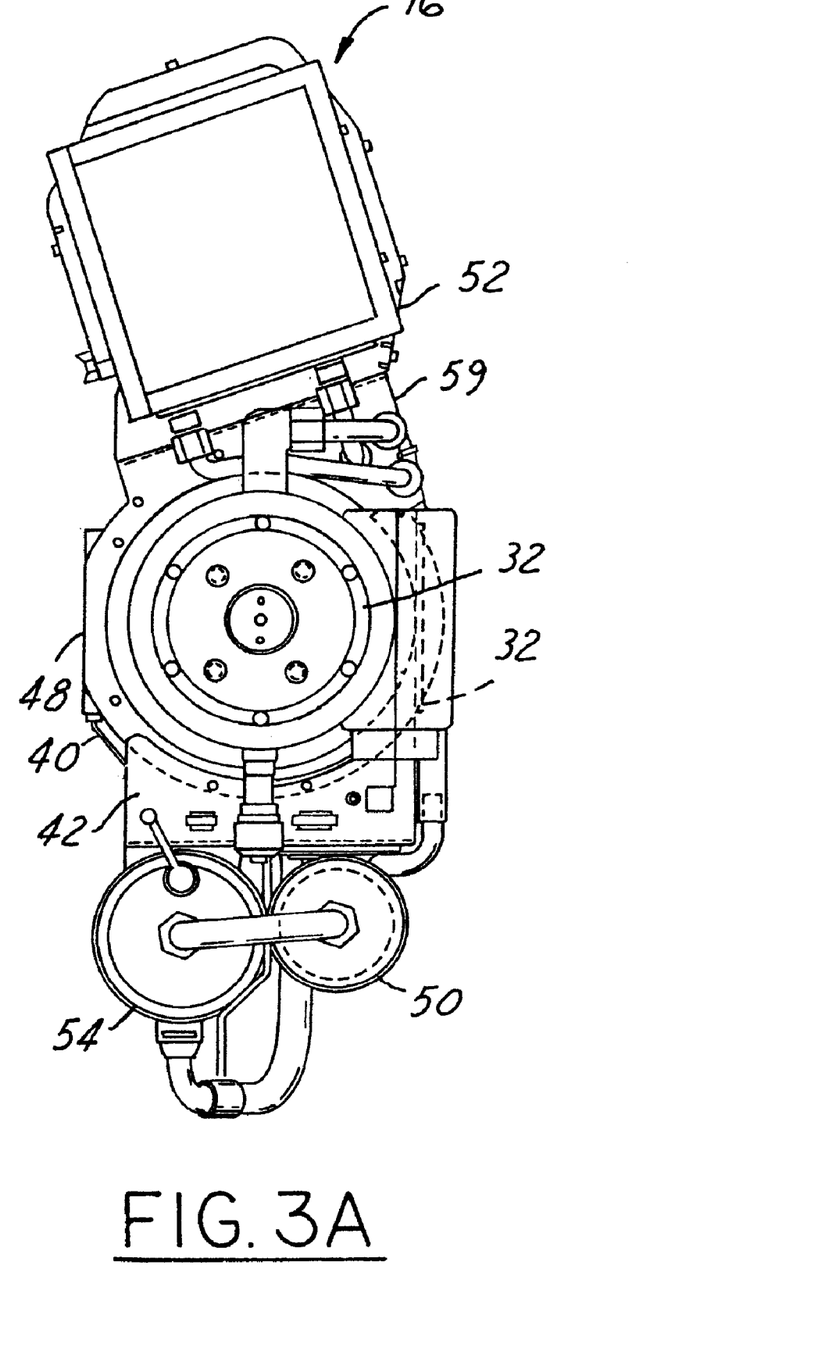
FIG. 3A is an anode side view of the imaging-tube in accordance with an embodiment of the present invention.
Figure 3B:
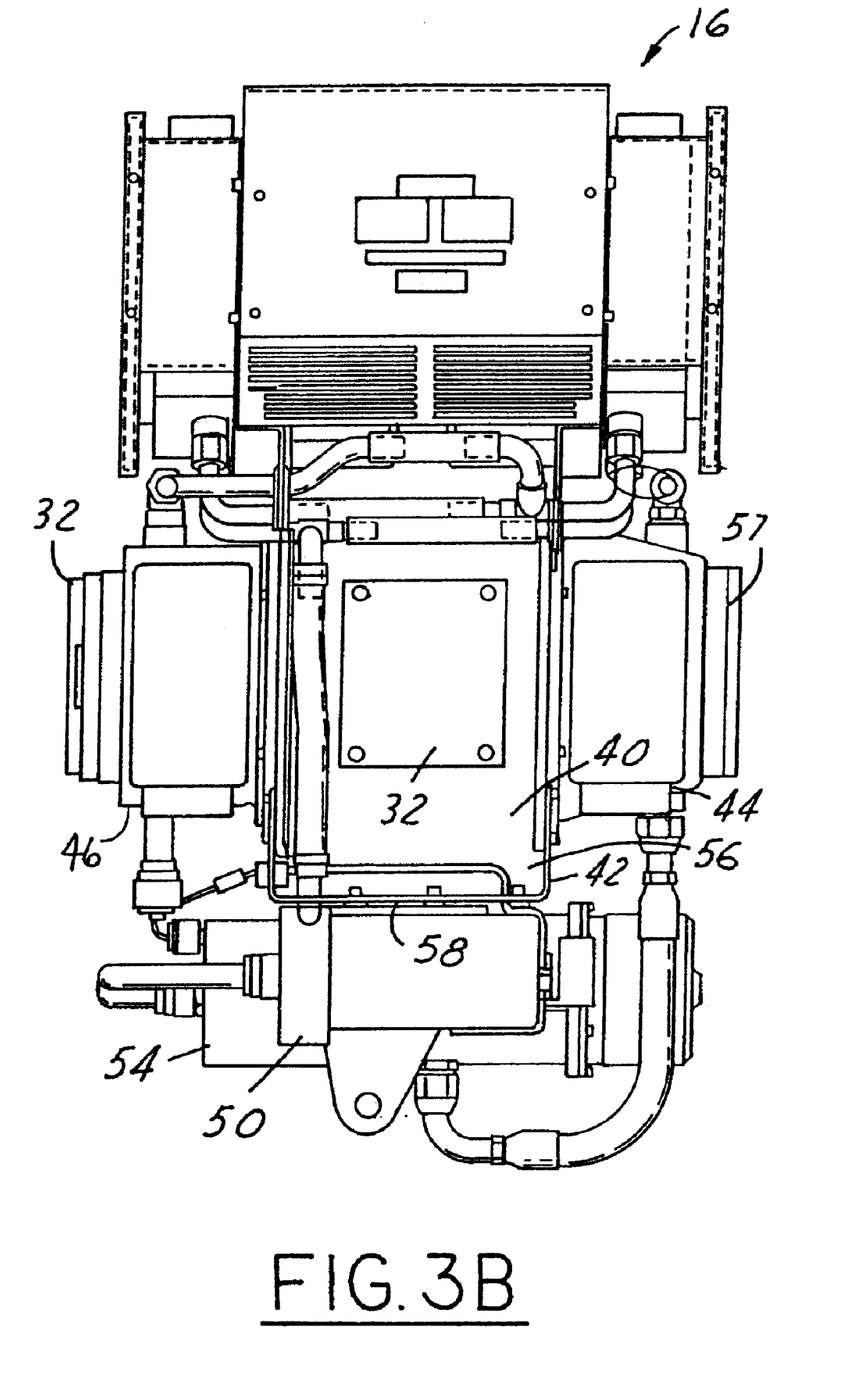
FIG. 3B is a top view of the imaging tube in accordance with an embodiment of the present invention.
Figure 3C:
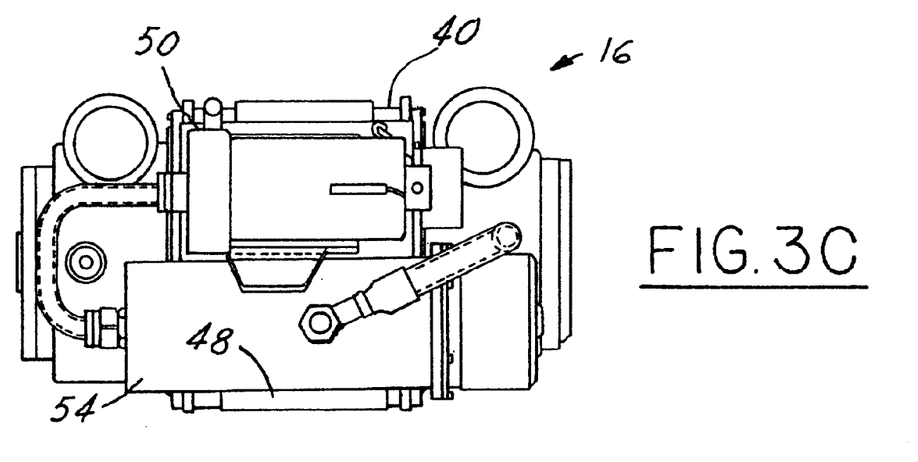
FIG. 3C is a pump and accumulator side view of the imaging tube in accordance with an embodiment of the present invention.

Referring now to FIGS. 3A, 3B, and 3C of an anode side view, a top view, and a pump and accumulator side view respectively, of the imaging tube 16 in accordance with an embodiment of the present invention are shown. The imaging tube 16 includes a main body 40 having a housing 42. An electron beam is accelerated from cathode 44 to anode 46, and results in emission of x-ray radiation through the x-ray port window 48. Since x-ray tubes operate at very low efficiency levels, a pump 50 is used to circulate oil through the housing 40 to a heat exchanger 52 to cool the imaging tube 16. An accumulator 54 is also used to allow for temperature-induced expansion and contraction of the oil. The imaging tube 16 has various feasible locations for mounting the adjustment plates 32 including; a top side 56 of the housing 42, a side 57 of the anode 46 or the cathode 44, a accumulator and pump side 58 of the housing 42, a top or bottom side 59 of the housing 42 between the heat exchanger 52 and the body 40, or other various feasible locations.

Figure 4:
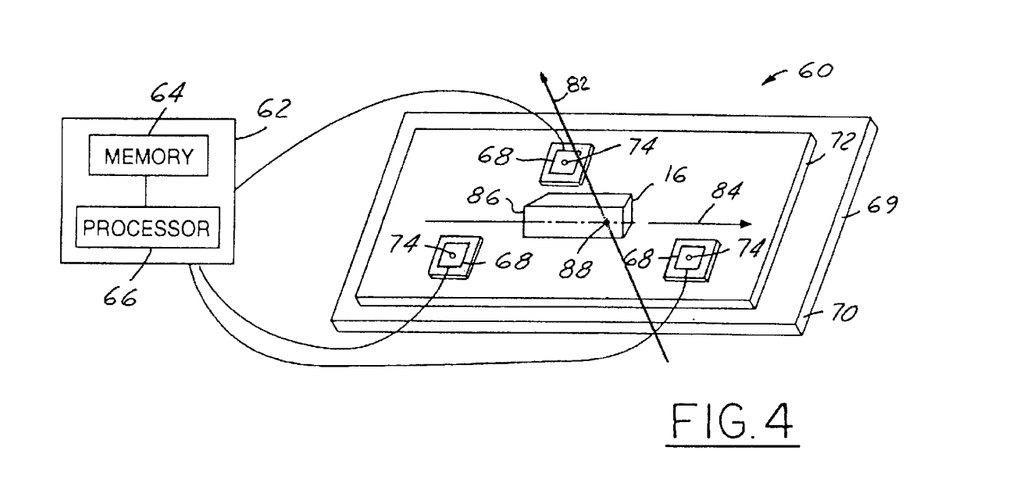
FIG. 4 is a block diagrammatic view of an imaging tube balancing system in accordance with an embodiment of the present invention.

Referring now to FIG. 4, a block diagrammatic view of an imaging tube balancing system 60 in accordance with an embodiment of the present invention is shown. The imaging tube 16 may be of various types including an X-ray tube or a camera tube. The balancing system 60 includes a controller 62 that is preferably microprocessor based such as a computer having a central processing unit 64, memory 66 (RAM and/or ROM), and associated input and output buses. The controller 62 may be a personal digital assistant or other programmable electronic device. The controller 62 is coupled to three load cells 68 located within a scaling assembly 69. The scaling assembly 69 includes a fixture 70 and a beadplate 72. The beadplate 72 and the imaging tube 16 are supported at three known points 74 by the load cells 68. The mass of the beadplate 72 and the imaging tube 16 is distributed to the points 74. Other scaling assemblies may be used to determine the imaging tube center of mass such as pendulum devices known in the art. The memory 64 contains stored desired values for application specific imaging tube desired mass and desired center of mass. The desired values may be stored in a spreadsheet or in a look-up table format. The processor 66 determines mass correction and center of mass correction values in response to actual and desired imaging tube mass and center of mass values.

Figure 5:
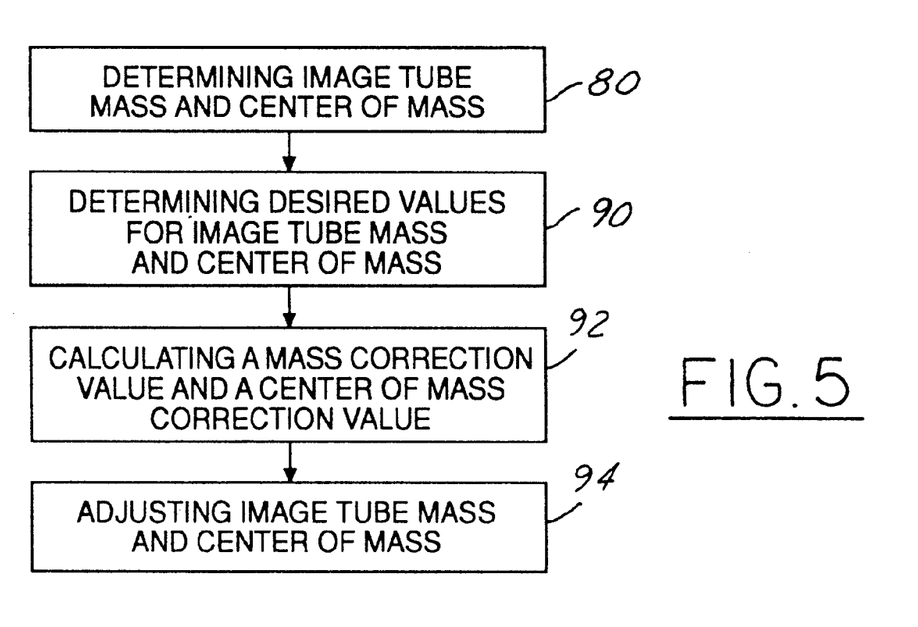
FIG. 5 is a flow-chart illustrating an imaging tube balancing method in accordance with an embodiment of the present invention.

Referring now to FIG. 5 and with reference to FIGS. 3A and 4, a flow-chart illustrating an imaging tube balancing method in accordance with an embodiment of the present invention is shown. Although, in the following steps an imaging tube balancing method is described, the same method may be applied to other gantry componentry as stated above.

In step 80, the controller 62 determines the imaging tube mass and center of mass. The mass of the image tube 16 equals the sum of the mass measured by each load cell minus the known mass of the beadplate 72. The processor 66 uses known algorithms to determine a first center of mass axis 82 corresponding to a first position and a second center of mass axis 84 corresponding to a second position. The imaging tube 16 is mounted to the beadplate in a known first position to determine the first center of mass axis 82. The imaging tube 16 is rotated 90°, to a second known position, so as to determine the second center of mass axis 84. The processor 66 in response to the first center of mass axis 82 and the second center of mass axis 84 determines the center of mass of the imaging tube 16, which corresponds to a point 88 where the first center of mass axis 82 crosses the second center of mass axis 84. The above-described method to determine the center of mass is by no means the only method that may be used, but because of its accuracy, time efficiency, and low equipment cost it is a preferred method.

In step 90, the processor 66 determines desired values, as stated above, for the imaging tube mass and center of mass. The desired values correspond to the application specific imaging tube and imaging system.

In step 92, the processor 66 calculates a mass correction value and a center of mass correction value in response to the initial (pre-balanced) and desired mass and center of mass values determined above. The correction values may include the differences between the initial and desired mass and center of mass values, style and type of adjustment plates 32 with corresponding mass for each plate, locations to attach the adjustment plates 32, to the imaging tube 16, and other information that may assist in balancing the imaging tube 16. The center of mass correction value preferably includes a direction vector and a magnitude value as to describe the difference between the initial mass and center of mass and the desired mass and center of mass.

In step 94, the mass and center of mass are adjusted to approximately match that of the desired mass and desired center of mass. Adjustment plates 32 are added to various locations of the imaging tube 16 to adjust the mass and center of mass. The adjustment plates 32 are preferably produced from various rigid materials including steel, aluminum, copper, brass, tungsten, lead, tin, or a rigid plastic as to maintain their shape and mass distribution, but other materials may be used.

Figure 6A:
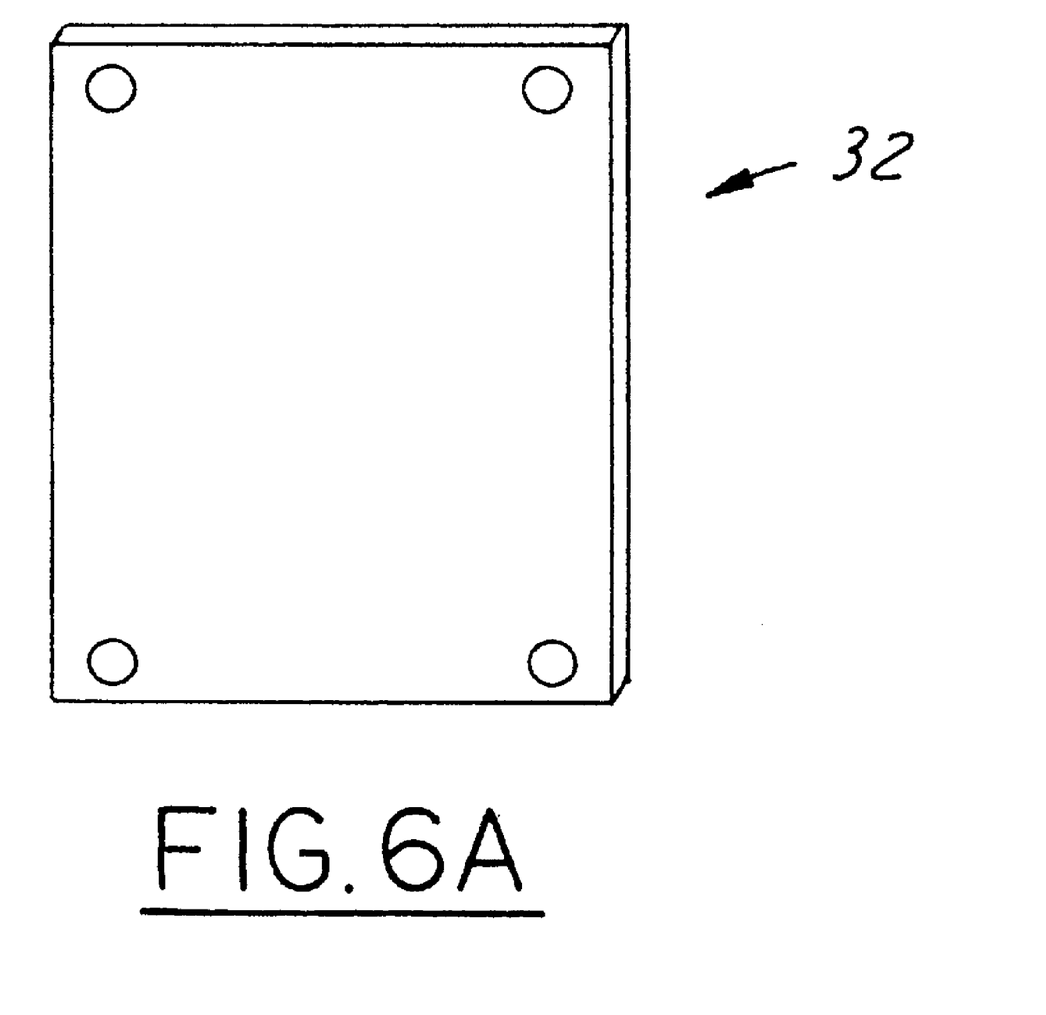
FIG. 6A is a close-up perspective view of an imaging tube balance adjustment plate in accordance with an embodiment of the present invention.
Figure 6B:
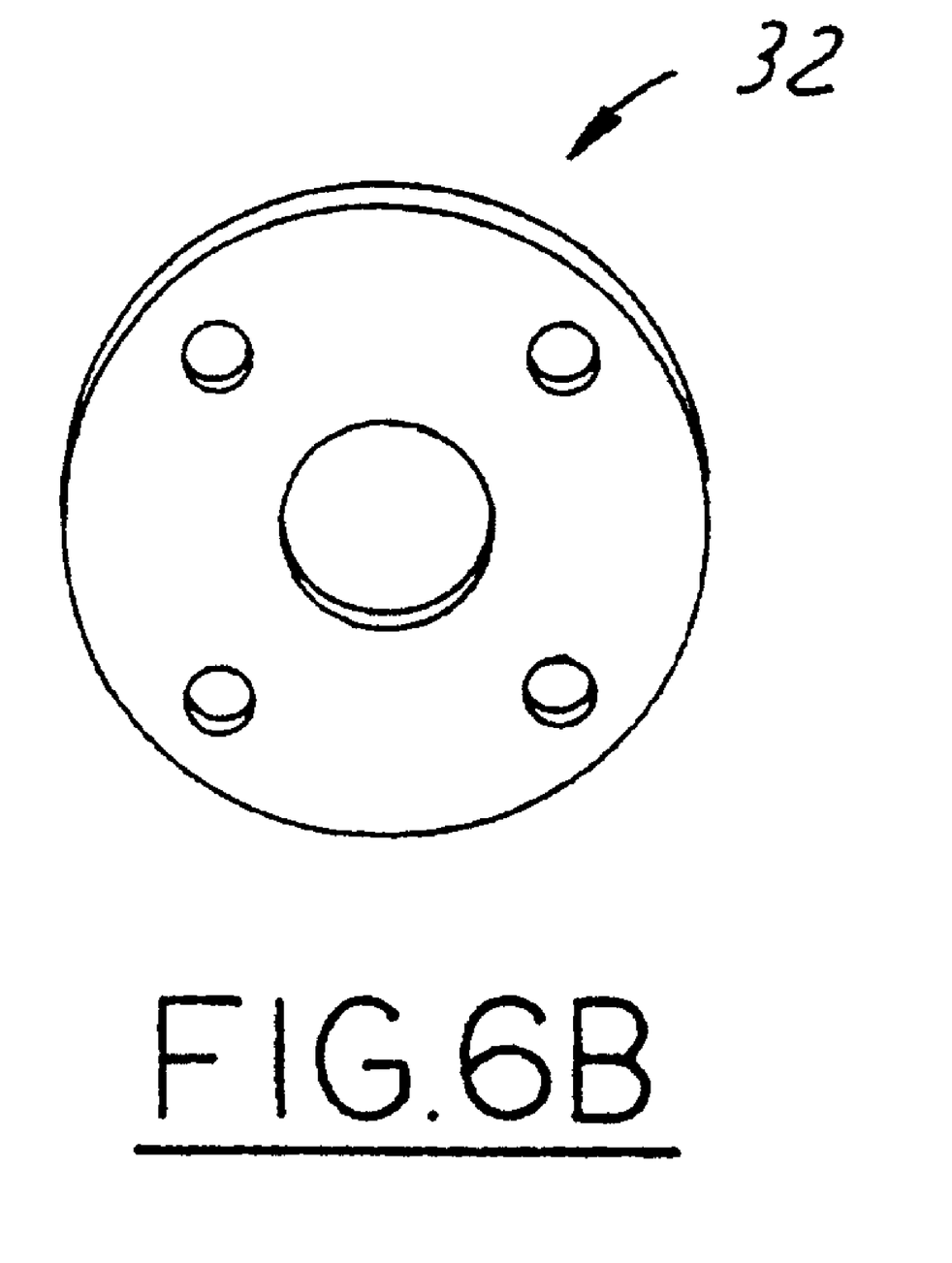
FIG. 6B is a close-up perspective view of an imaging tube balance adjustment plate in accordance with another embodiment of the present invention.

Referring now to FIGS. 6A and 6B, close-up perspective views of the adjustment plates 32 in accordance with an embodiment of the present invention are shown. The adjustment plates 32 may be of various sizes, shapes, styles, mass, mass distributions, and attachment methods. The attachment methods may include fasteners, bonding materials, and other known methods. Throughout this application the term adjustment plates does not necessarily connote a thin flat rigid body. Other styles of objects may be used.

The present invention by pre-balancing an imaging tube to a desired mass and center of mass before use in an imaging system significantly reduces the probability of rebalancing a gantry, thereby reducing costs involved in rebalancing and equipment down-time and providing an accurate and time efficient balancing technique for an imaging system.

The above-described apparatus, to one skilled in the art, is capable of being adapted for various purposes and is not limited to the following systems: CT imaging systems and other systems requiring system level balancing or balancing of componentry. The above-described invention may also be varied without deviating from the spirit and scope of the invention as contemplated by the following claims.

What is claimed is:

1. Gantry component balance adjustment plates having conforming geometries of an imaging system component and desired weights, weight distributions, and assigned attachment locations on said imaging system component, said gantry tube balance adjustment plates maintaining shape and mass distribution within an imaging system environment.

2. A method for pre-balancing a gantry component for use in an imaging system, using said balance adjustment plates of claim 1, said method comprising:
   determining the gantry component mass;
   determining gantry component center of mass;
   determining a desired mass and a desired center of mass;
   calculating a mass correction value in response to said gantry component mass and said desired mass;
   calculating a center of mass correction value in response to said gantry component center of mass and said desired center of mass; and
   adjusting said gantry component mass and said gantry component center of mass using said balance adjustment plates in response to said mass correction value and said center of mass correction value respectively.

3. A method as in claim 2 wherein determining the center of mass of the gantry component comprises:
   determining a first center of mass axis;
   rotating the gantry component onto an adjacent side;
   determining a second center of mass axis; and
   determining said center of mass in response to said first center of mass axis and said second center of mass axis.

4. A method as in claim 3 wherein determining a first center of mass axis and determining a second center of mass axis comprises:
   determining a plurality of mass values at a plurality of known points on the gantry component corresponding to a massed distribution of the gantry component on said known points;
   determining a center of mass axis in response to said plurality of mass values and said plurality of known points.

5. A method as in claim 2 wherein determining a desired mass and a desired center of mass comprises using a spreadsheet containing gantry component desired mass corresponding to various imaging systems.

6. A method as in claim 2 wherein determining a desired mass and a desired center of mass comprises using an electronic device to determine said desired mass and said desired center of mass.

7. A method as in claim 2 wherein adjusting said gantry component mass and said gantry component center of mass comprises coupling a determined number of said balance adjustment plates to said gantry component.

8. A method as in claim 2 wherein pre-balancing a gantry component for use in an imaging system comprises pre-balancing a gantry component selected from a group consisting of: an imaging tube, a collimator, an X-ray detector, a high voltage tank, and a data logger.

* * * * *